United States Patent [19]

Vogel, Jr.

[11] 4,139,061
[45] Feb. 13, 1979

[54] CONVERTIBLE RACING PLATE WITH EXCHANGEABLE CALKS

[75] Inventor: W. Martin Vogel, Jr., Mendham, N.J.

[73] Assignee: Kwik-Kalk Corporation, Montclair, N.J.

[21] Appl. No.: 721,449

[22] Filed: Sep. 8, 1976

Related U.S. Application Data

[63] Continuation-in-part of Ser. No. 597,670, Jul. 21, 1975, abandoned.

[51] Int. Cl.² ............................................. A01L 7/04
[52] U.S. Cl. ....................................................... 168/41
[58] Field of Search .......................... 168/29, 31, 41, 43

[56] References Cited

U.S. PATENT DOCUMENTS

| 613,883 | 11/1898 | Hoppesch | 168/41 |
|---|---|---|---|
| 984,385 | 2/1911 | Miller | 168/43 X |
| 1,159,488 | 11/1915 | Gallup | 168/41 |
| 1,210,648 | 1/1917 | Hersey | 168/41 |
| 1,320,878 | 11/1919 | Lindberg | 168/41 |
| 1,361,744 | 12/1920 | Porter | 168/41 |
| 3,050,133 | 8/1962 | Ketner et al. | 168/4 |

Primary Examiner—Russell R. Kinsey
Assistant Examiner—Daniel J. Leach
Attorney, Agent, or Firm—Brumbaugh, Graves, Donohue & Raymond

[57] ABSTRACT

On both heels of a racing plate a boss is formed having a top surface lying substantially flush with the top surface of the shoe, and an upwardly facing opening including a shallow recess and a mortise extending completely through the shoe is formed in each boss for receiving an insert. The insert formed of abrasion resistant material has a capital which lies in the recess, and a tenon which slides snuggly into the mortise and is held in place by a resilient O-ring. The insert capital supports the side walls of the recess and the recess walls exclude dirt from wedging between the capital and recess floor and lifting out the insert. A calk is made by forming a cleat on the insert capital; without a cleat, the insert is a wear plate whose top surface is flush with the top surface of the boss, providing a zone of increased wear resistance to decrease the wear of the heels. A tool is provided for facilitating easy removal and exchange of inserts so that the same shoe can be used, with inserts of various shapes and sizes, on all racetracks under all surface and climatic conditions.

11 Claims, 15 Drawing Figures

CONVERTIBLE RACING PLATE WITH EXCHANGEABLE CALKS

BACKGROUND OF THE INVENTION

This is a continuation-in-part of application Ser. No. 597,670 filed on July 21, 1975 and now abandoned.

This invention relates to horseshoes for race horses, such shoes sometimes referred to as racing plates, and in particular, to racing plates provided with means for receiving calks, and for securely, though releasably holding the calks in place against rotation and translation.

It is often desirable to provide calks on the heels of racing plates for the front legs of a race horse to increase the traction of the racing plate on the track. The heel portion of the horseshoe provides the optimum area for gripping the ground, because the fetlocks on the front legs of a galloping horse collapse when the front hooves strike the ground, so that the rear portion of the hoof and shoe bears the majority of the horse's weight. Accordingly, on a soft or muddy track, a calk on the heel portion of the shoe can have an important traction effect, both for forward propulsion and lateral stability, that is, resistance to sideways slipping.

A muddy or soft track is "slow" partly because the horses lack sufficient traction for efficient forward propulsion, but more importantly, because the horse is unsure of his footing and hence does not run as hard as he is able. By providing calks on the front shoes, the horse acquires both increased traction for forward propulsion, and increased lateral traction against sideways slipping for secure footing. With good forward and lateral traction, the horse is given the traction he needs to run fast, and the confidence in his footing he needs to run with maximum effort.

Good traction is, naturally, extremely desirable on race day, but is also very important during training workouts to enable a trainer to adhere to a training schedule that is carefully designed to bring the horse to the peak of his performance on race day. For example, a carefully prearranged training program may include "breezing" or fast running for a certain distance on a certain day before the race. If the track is wet or soft that day, the trainer may feel obliged to omit that run out of concern that the horse might slip and be injured on the sloppy track, or he may have it run at a slower pace. Even if the trainer decides to risk a fast run in order to adhere to his training schedule, the horse himself may simply not run as hard as he should because of the insecure footing. The use of calk shoes overcomes these problems, and enables the trainer to avoid a disruption to his training program because of the weather, and also enables him to secure the speed increase that shoes with calks usually give to the horse on the day of the race on a muddy track.

Notwithstanding the advantages of calk shoes, there is much reluctance among trainers to use them. The front hooves of a thoroughbred horse should not be permanently shod with shoes having calks permanently attached to the heel because on a dry track it can result in an uneven distribution of pressure on the horse's hoof that could produce soreness or lameness. In addition, it can cause unstable footing on solid surfaces such as concrete, wood or asphalt and thereby increase the risk of injury to the horse.

In view of these circumstances, it has been the practice of some trainers who use calks to shoe their horses with shoes having permanently affixed calks when the horses are to run on a muddy track or turf, and then to twist off the calks from the shoes when the track dries. If it again becomes desirable to use calks, the shoes from which the calks have been twisted must be removed and the horse reshod with new shoes having permanently affixed calks. This is not a common practice, however, for several reasons. Reshoeing the horse on the day of the race is usually regarded unfavorably. It upsets some horses and may affect their performance in the race. If the horse is reshod too frequently it can damage the hoof and cause lameness, and there is no certainty that a blacksmith will be available on race day when it is desired to reshoe the horse.

Another disadvantage of racing plates having permanently affixed calks relates to the wide variation of front hoof action among horses. The movement of the front hooves of race horses is a highly individual phenomenon: different horses will drive their front hooves in various ways, e.g. turning them out to the sides and in complex patterns while galloping. It is therefore difficult to determine whether a particular horse is suited to use calks of a particular design, or even any calks at all.

There are two standard calk designs for fore shoes: the groove calk and the mud calk; and two standard calk designs for hind shoes: stickers and blocks. Most horses run best with one or another of these designs, or with different sizes or combinations of these designs (for example, groove calk on one hoof, mud calk on the other; or a groove calk on the outside of both shoes and a mud calk on the inside, and corresponding combinations for the hind shoe stickers and blocks). The only way heretofore possible to discover if a particular calk design was suited for a particular horse was by trial and error, i.e. shoe him with racing plates having calks of a particular design and observe his performance. If that design proved unsuitable these racing plates would be removed and another set of racing plates having calks of a different design would be mounted and the horse would be run with these shoes. This process could be repeated until a satisfactory design was found or the trainer concluded that none of the rather limited available designs was satisfactory. This procedure requires much time and attention and it is very difficult to control all the variables to properly evaluate the effect of the different shoe designs.

Most trainers are aware of the many dangers and disadvantages inherent in the use of conventional racing plates having permanently affixed calks, viz. the danger of upsetting or injuring the horse by excessive or ill-timed shoeings, the risk of injuring the delicate ankle of the horse's foreleg by the use of unsuitable calk designs, the limited number of available designs, the fact that the optimum calk design is different for different track compositions (e.g. dirt, turf, artificial composition) and different weather conditions, and finally, the likelihood of subjecting themselves to criticism by the owner that they had impaired the horse's performance or causes injury or lameness to the horse by using procedures having known disadvantages. Most trainers regard these disadvantages and risks of using shoes with permanently affixed calks as far exceeding the known substantial benefit and advantage to be gained by their use, and simply decline to use them.

In the prior art, there have been attempts to design horseshoes with removable calks, primarily for cart horses for use on icy roads. These shoes are unsuitable for race horses because they were designed for the thick, strong ankle of a cart horse and are far too large and heavy for the slim, delicate ankle of a thoroughbred. More importantly, however, the added increment of weight that they represent over conventional racing plates would cause a substantial reduction in the horse's speed. For this reason, conventional iron horseshoes are virtually never used on race horses.

The prior art attempts to design racing plates with removable calks have been unsuccessful for a variety of reasons and are not commonly in use despite the general dissatisfaction with existing racing plates having permanently affixed calks, and a strongly felt need for racing plates with removable calks. One reason for the lack of acceptance of the prior art shoes has been the presence of a raised boss on the heel portion of the racing plate. The raised boss has been necessary to provide a mounting plinth of sufficient strength to support the calk since racing plates (as illustrated in U.S. Pat. No. 1,763,433) are substantially thinner than conventional shoes and are formed of lightweight aluminum alloy, rather than forged steel or iron. The presence of a raised boss on a racing plate, to the extent that it is elevated above the plane of the shoe, may cause the same kind of difficulties caused by a permanently affixed calk.

Still another difficulty with prior art removable calk racing plates is the difficulty of reliably securing the calk at the desired angle with respect to the axis of the shoe. This is necessary to give the desired traction in the desired direction, and also to prevent the calk from falling out of the shoe altogether. A potentially more serious problem could be caused by a groove calk which is fixed parallel to the nail groove of the shoe, turning perpendicular to the axis of the shoe. If, in turning, it projected beyond the sides of the shoe, the projecting portions of the calk could then rip along the adjacent leg of the horse while he was running, causing great injury and possibly permanently crippling the horse.

Another deficiency in the prior art has been the difficulty of removing and reinserting the removable calk. A blacksmith or trainer works on a horse's hoof while gripping it between his knees or supporting it on one thigh while bending over at the waist to see what he is doing. It is an awkward position, ill-suited for fine work such as minute positioning or manipulating of small pieces. Moreover, some prior art removable calk shoes require the calk to be hammered into place and also must be driven off. Trainers of race horses are reluctant to do any unnecessary hammering harder than a light tap on the hoof of a thoroughbred because of the risk of loosening the shoe or making the horse nervous and upset.

Thus, the calks in removable calk shoes should be easily inserted, should stay securely in place, and should be easily removed with a quick, sure and easy operation that will not tend to loosen the shoe. When calks are removed, the shoe should be as flat, thin, and light as standard racing plates. It is also desirable that the calks themselves be provided in various designs and be interchangeable to either side of the racing plate to minimize problems of manufacturing and inventory, etc. These several problems have not been solved in the prior art to the satisfaction of trainers of race horses as evidenced by the absence of scarcity of removable calk shoes in use.

SUMMARY OF THE INVENTION

Thus, it is an object of this invention to provide a racing plate which can be converted to calked shoes in a few seconds with a fast, simple and reliable operation. The racing plates of this invention, when used without calks, are provided with wear plates, and in this configuration, are equivalent to the weight and form of a standard racing plate having a thin, flat and undisturbed heel portion, but do not wear out as quickly as conventional plates do. The ease, speed and simplicity with which the calks may be exchanged enable the trainer to safely experiment with different calk designs, so it is an easy matter to discover the optimum calk parameters, such as size, shape, orientation, and material, for the track on which the horse is running. Thus, the trainer can keep on hand a stock of calks that would be usable on every type of surface on which his horses run so that he could quickly and optimumly adapt the shoes being worn by his horses to the conditions existing at the time the horses are to be run.

DESCRIPTION OF THE DRAWINGS

These and other objects of the invention will become more apparent by reading the following detailed description of the preferred embodiment in conjunction with a consideration of the appended drawings, wherein:

FIGS. 8A-11A are perspective views from above of inserts for the embodiments of FIGS. 8-11, respectively.

DESCRIPTION OF THE PREFERRED EMBODIMENT

Figure 1:
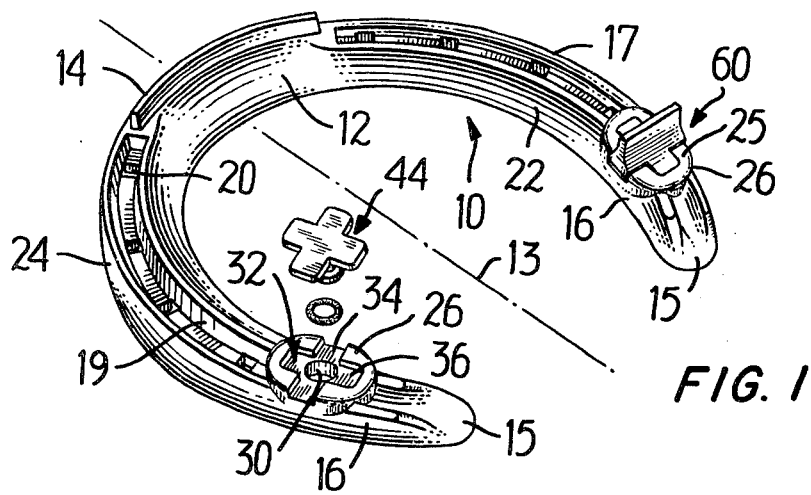
FIG. 1 is a perspective view of the top side of a racing plate showing a wear plate exploded out of the left side and a removable calk in "mud calk" position in the right side.

Referring now to the drawings wherein like and primed reference characters designate identical or corresponding parts, and more particularly to FIG. 1 thereof, a racing plate 10 for the fore hooves of a race horse is shown having a central, forward-most portion or toe 12 in which is permanently fixed a steel toe calk 14. The shoe is symmetrical about a central fore-and-aft axis 13 which lies in the plane of the shoe and through the toe 12. The body of the shoe curves around rearwardly from both sides of the toe 12 symmetrically about the axis 13 and terminates in a pair of rearwardly disposed heel portions 16, each of which tapers down to a terminus 15 of reduced thickness. With the exception of the heel portions 16, the shoe and the toe calk 14 are substantially as shown in U.S. Pat. No. 1,763,433 to E.

H. Langlois, the disclosure of which is hereby incorporated by reference.

Reference herein and in the appended claims to the "top surface" will be to the upwardly facing surface in FIG. 1, despite the fact that this is the ground contacting surface when the racing plate is mounted on the hoof of a horse. The "bottom surface" 18 is the flat surface facing downwardly in FIG. 1, which in use, is mounted flush against the underside of the horse's hoof. Illustration of the racing plate in this orientation and reference to the upwardly facing surface in this illustration as the "top surface 17" and to the downwardly facing surface as the "bottom surface 18" is for ease of illustration and clarity of disclosure.

A nail groove 19 is formed in the top surface 17 of the shoe 10 and runs substantially parallel to the curve of the body of the shoe around most of the length thereof. A plurality of nail holes 20 are formed in the floor of the nail groove 19 for receiving shoeing nails by which the shoe 10 may be affixed to the hoof of the horse.

Figure 5:
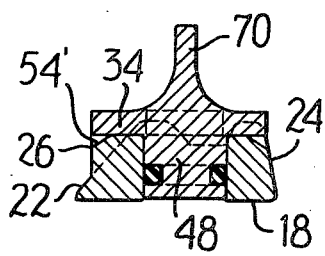
FIG. 5 is a cross-section along lines 5—5 in FIG. 2.

In cross-section shown in FIG. 5, the inside surface 22 of the shoe slopes downwardly and inwardly from the top surface 17 to the bottom surface 18 at an angle of approximately 43° from the vertical. The outer surface 24 of the racing plate slopes downwardly and outwardly from the top surface to the bottom surface of the shoe at a much steeper angle of approximately 15° from the vertical. The thickness of the shoe from the top surface 17 to the bottom surface 18 is approximately 6.35 mm.

Figure 6:
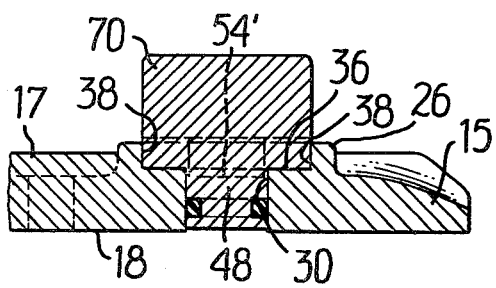
FIG. 6 is a cross-section along lines 6—6 in FIG. 2.

An elliptical shaped boss 26 having a flat top surface 25 is formed on the heel portions 16 of the shoe 10. The boss 26 fills the nail groove 19 and extends vertically from the sloping inside surface 22, as most clearly shown in FIGS. 2 and 5. The top surface of the shoe at the location of the boss is thereby widened although the shoe at that point is no thicker or wider than the underlying portions of the bottom surface 18 of the shoe. The top surface 25 of the boss 26 must be substantially flush with the top surface 17 of the shoe; it may project slightly above the top surface 17 of the shoe, as shown in FIG. 6 but its elevation must not be enough to affect the horse's footing or significantly alter the distribution of pressure on the horse's hoof. In the embodiment illustrated, the top surface 25 of the boss 26 projects above the top surface 17 of the shoe approximately one mm.

Figure 2:
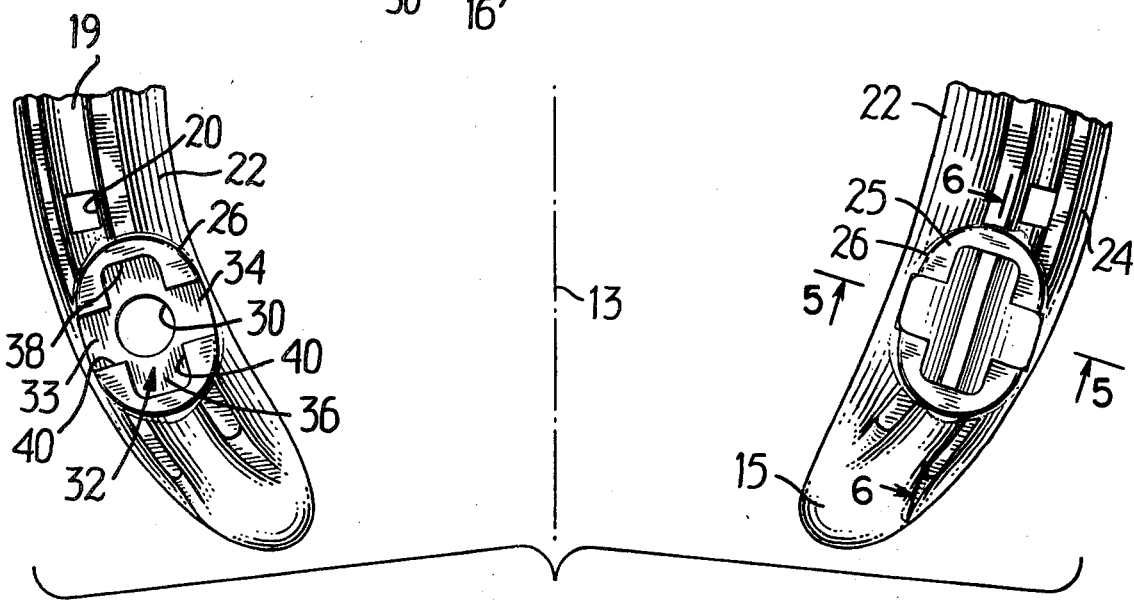
FIG. 2 is an enlarged plan view of the heel portion of the shoe shown in FIG. 1 with the wear plate removed and the calk shown repositioned 90° from the position illustrated in FIG. 1 to its "groove calk" position.

A mortise in the form of a vertical cylindrical bore 30 having an upwardly opening chamfered mouth is formed centrally in the boss 26 and extends completely through the shoe. A shallow cruciform recess or groove 32 having a flat cruciform-shaped floor 33 is formed, as by milling or forging and coining approximately 1.91 mm. deep into the top surface of the boss 26 and is centered on the cylindrical bore 30. One channel or arm 34 of the groove 32 is centered on the minor axis of the boss and extends generally transversely of the nail groove 19, forming an angle of approximately 70° with the fore-and-aft axis 13 of the racing plate and providing an inside and an outside recess lobe. The other channel or arm 36 of the cruciform groove is centered on the major axis of the boss 26 and extends approximately tangentially to the nail groove at that point, making an angle of approximately 20° with the axis 13 and providing a forward and a rearward recess lobe. As shown in FIG. 5, the channel 34 of the groove 32 extends completely across the boss and is open at its ends. As shown in FIGS. 2 and 6, the channel 36 of the groove 32 does not extend completely across the boss but terminates short of its extremities in upright walls 38. The sides of the two channels of the cruciform groove 32 are defined by side walls 40. The horizontal plan shape of the cruciform groove 32 is defined by the shape of the floor 33 and by the vertical walls 38 and 40 and the edge of the boss 26 at the open ends of the channel 34. The cruciform figure is symmetrical about two axes in the plane of the figure for a purpose which will appear presently.

Figure 3:
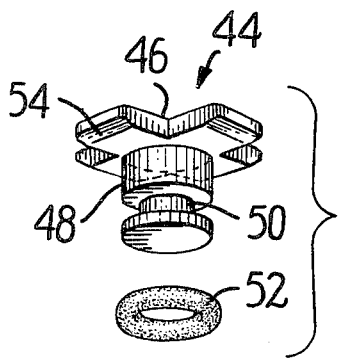
FIG. 3 is a perspective view from below of the wear plate shown in FIG. 1.

Looking now at FIG. 3 an insert is provided for insertion into the mortise 30 and recess 32. The form of insert shown in FIG. 3 is a wear plate 44 having a flat cruciform capital 46 and a cylindrical tenon 48 connected to and depending perpendicularly from the center of the underside of the capital 46. The diameter of the tenon 48 is substantially the same as the diameter of the mortise or bore 30 to enable the tenon 48 to slide snugly into the bore 30. The length of the tenon 48 is slightly less than the depth of the bore 30 below the floor 33 of the groove 32, or approximately 5.46 mm. in the embodiment shown. An annular cannelure 50 is formed adjacent the lower end of the tenon 48 to receive a Neoprene O-ring 52, shown in FIG. 3 exploded out of the cannelure 50 for clarity of illustration. The mouth of the bore 30 is chamfered so that the O-ring will not be sheared off when the tenon 48 is pushed into the bore 30. The O-ring projects slightly beyond the outside diameter of the tenon 48 so that, with the tenon 48 in place in the bore 30, the O-ring is compressed and resiliently bears against the walls of the bore 30 to hold the tenon 48 in place. The O-ring 52 also provides an air seal between the tenon 48 and the bore 30. It is believed that the horse's hoof grows around the lower end of the bore 30 and seals it, and that the O-ring 52 forms an air seal between the walls of the bore 30 and the tenon 48 which provides an additional vacuum-type resistance against axial translation of the tenon 48 out of the bore 30.

Although I have found the O-ring 52 to hold the wear plates and calks in place, it might be desirable for additional security against accidental displacement of a calk to burnish a slight annular recess in the wall of the bore 30 at the depth of the O-ring. This should increase the holding tendency of the O-ring since the O-ring could then expand into the recess and removal would require recompression of the O-ring as well as overcoming its frictional force against the walls of the bore 30.

The capital 46 of the insert is formed with the same plan configuration and dimensions as the cruciform groove 32 formed in the top surface of the boss 26. In the embodiment illustrated, each of the two arms is approximately 14.20 mm. long and fit snugly in the cruciform groove 32. The top surfaces of the boss and capital are flush, although the capital 46 may project slightly above the top surface 25 of the boss 26 to insure that manufacturing tolerances do not result in occasional wear plates 44 lying below the level of the boss top surface 25. When the insert is positioned with its cylindrical tenon 48 in the cylindrical bore 30 and the capital 46 nested into the cruciform groove 32, the walls 38 and 40 of the groove 32 are supported by the corresponding walls of the capital 46, and the cylindrical walls of the cylindrical bore 30 are supported by the tenon 48 against collapse and deformation which would occur by reason of impact with rocks and dirt if the horse were to be run without the inserts in place.

The channel 36 of the cruciform groove 32 terminates in the wall 38 as shown in FIG. 6, although it could extend completely across the boss to open at its ends, like the channel 34, for ease in cleaning. However, I prefer to terminate the arms 36 in walls 38 to conceal the forwardly facing lower outside corners of the capital 46 to prevent the possibility of dirt being forced between the vertically facing abutting surfaces of the capital and the floor 33 of the groove 32 by the driving action of the shoe forward and downward into the dirt. Dirt so forced under the capital 46 might tend gradually to lift the insert out of place far enough to fall out of the shoe altogether. The walls of the groove 32 and bore 30 would then no longer be supported and would be crushed in by the pounding of the racing plate against rock and dirt as the horse ran. No harm would come to the horse, but the racing plate would no longer be able to accept inserts; it would then be like a conventional racing plate without heel calks or wear plates.

The wear plates 44 are formed of a durable material, such as stainless steel, duralloy, hardened steel or some forms of polyurethane or nylon which are considerably harder or more abrasion resistant than the aluminum alloy of which the racing plate 10 is formed. The wear plates 44 thus provide a relatively hard or abrasion resistant zone on the surface of the racing plate which prolongs the life of the heel. This not only protects and extends the life of the boss and the groove 32 formed therein but also extends the wearing life of the heels, and therefore the racing plates themselves. In all other respects, the racing plate 10, with the wear plates 44 in place in both heels is substantially equivalent in size, weight, and effect to a conventional racing plate without heel calks.

Figure 4:
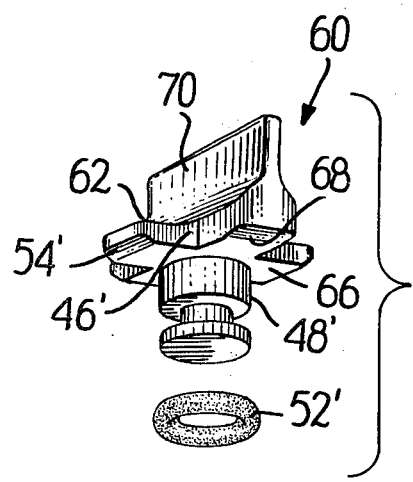
FIG. 4 is a perspective view from below of the calk shown in FIG. 1.
Figure 7:
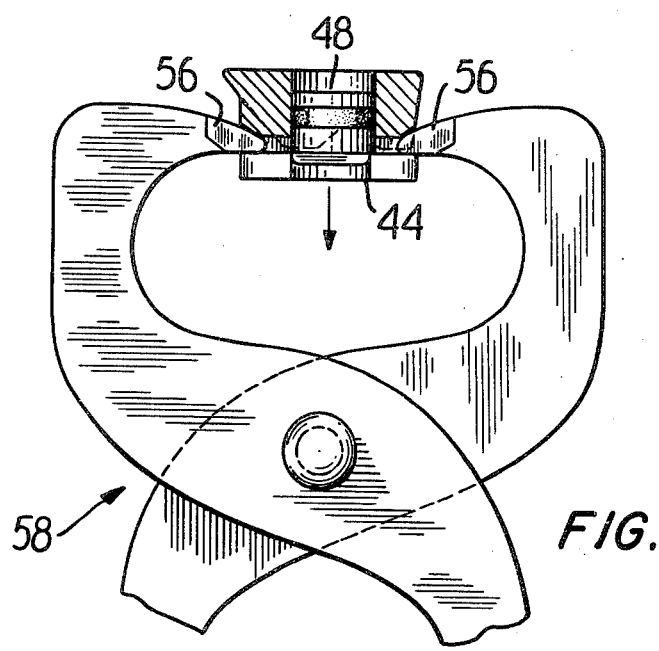
FIG. 7 is a partial side elevation of a tool for removing the inserts from the racing plates of this invention.
Figure 8:
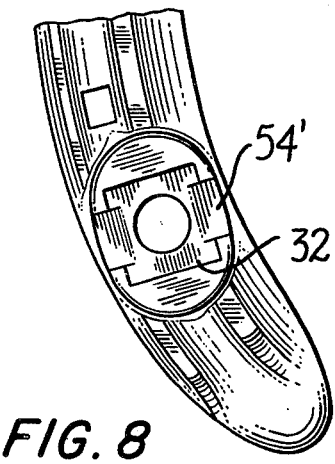
FIGS. 8-11 are plan views of four alternative embodiments of the invention.
Figure 10:
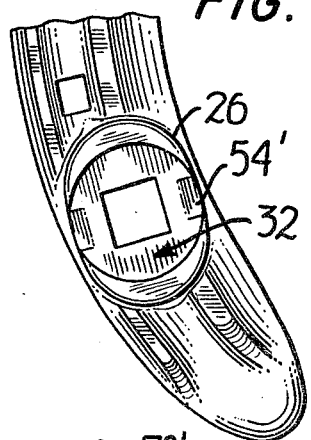
Figure 11:
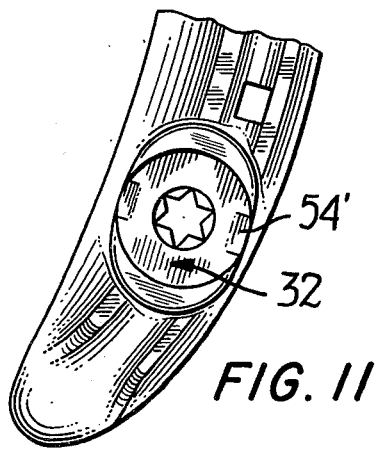

As shown most clearly in FIGS. 3 and 4, the extremities of the arms of the cruciform capital 46 of the inserts are beveled on the lower outside corners of the arms to provide a chamfer 54. Alternatively, as shown in FIGS. 5 and 7, the chamfer 54' is formed by beveling the outside edges of the channel 34 of the groove 32. The chamfer provides a small wedge-shaped recess at the lower outside corners of the arms of the inserts to facilitate removal of the inserts by use of an extracting tool 58, as shown in FIG. 7. The extraction tool 58 has a pair of wedge-shaped jaws 56 which register with the wedge-shaped recess provided by the chamfer 54. The handles of the tool 58 are squeezed by hand to force the jaws 56 into the wedge-shaped recesses and, by wedging action, lift the insert smoothly out of the shoe. The tool 58 exerts an upward extracting force on the inserts, and a downward reaction force on the shoe, thereby obviating the need to exert pulling or twisting forces on the insert which would tend to loosen the shoe. The action is smooth, fast and reliable and can be done with great ease in just a few seconds by the trainer or his assistant without the assistance of a blacksmith.

With the wear plate 44 removed, the trainer merely inserts a calk he has selected into the place vacated by the wear plate 44. A few taps with a hammer or the flat face of the tool 58 will seat the capital 46' of the calk into the cruciform groove 32 thus completing the operation of converting the racing plate from uncalked to calked in a matter of seconds. The job is so easy and fast it is literally possible to delay the decision whether to use calks until the horses are already in the paddock awaiting the parade to the starting line.

Turning now to FIG. 4, a calk 60 is shown having a top portion 62 which is cruciform in plan and is connected to a tenon 48' identical to the tenon 48 of the wear plate 44 described previously. The cruciform top portion 62 of the calk 60 is formed of a capital 46' which is the same shape and has the same dimensions as the cruciform capital 46 of the wear plate 44. That is, it has an arm 66 centered on and perpendicular to the axis of the tenon 48' and of the same length as the arms of the cruciform capital 46 of the wear plate 44. The calk 60 also has an arm 68 orthogonally disposed to the arm 66 and of the same length. The top portion 62 of the calk 60 also has a cleat 70 integral with and extending upright from the arm 68. As shown in FIGS. 2, 4, and 5, the two long sides of the cleat rise in a pair of converging curves from the top edges of the arm 68 and project vertically upward in a blunt stubby blade symmetrically disposed about the axis of the arm 68.

The angular orientation of the cleat 70 in the shoe may be important. The horse may run best with "groove calks," that is, with the length of the cleat approximately tangential to the nail groove as shown in the right heel of FIG. 2 and in FIGS. 5 and 6. Alternatively, or under other conditions, he may run best with "mud calks," that is, with the length of the cleat generally transverse to the axis of the shoe as shown in the right heel in FIG. 1. The horse, in still another alternative, may run best with some combination of mud calk, groove calks, and wear plates. Thus, it may be of considerable importance to the trainer to insure that the calks remain in the angular orientation he selects. Using this invention, the calks will indeed maintain their preselected angular orientation because the O-rings 52 and 52' hold the tenons 48 and 48' firmly in the bore 30 so that the walls 38 and 40 engage the corresponding walls of the inserts to prevent them from turning. If it is desired to change the angular orientation of the calk 60, it is sufficient to merely lift it out of the bore 30 enough so that the capital 46' clears the top surface 25 of the boss 26. The calk is then rotated 90° and pushed or tapped back into place. It is for the purpose of enabling the calk 60 to be inserted in the shoe opening in more than one orientation that the recess 32 and the insert capitals 46 are formed as regular geometric figures symmetrical about at least two axes in the plane of the figure. The value of the calks are thus greatly enhanced because the same calk can be used in different orientations, thereby reducing the number of calks a trainer needs to keep on hand.

The shape and size of the cleat 70 may be varied to suit the conditions under which it is to be used. For a firm artificial composition track with good drainage, for example, a calk having a lower cleat with beveled corners or one formed of plastic material molded onto a projecting metal stub would suffice, whereas on a turf or muddy dirt track a longer cleat might be needed.

The calks and wear plates may also be molded entirely from plastic material such as high density nylon or polyurethane, in which case the O-ring could be replaced with a simple bead molded on the shank.

Four examples of inserts molded entirely from plastic material are illustrated in FIGS. 8A-11A. In these figures, the tenons 48" are shown greatly elongated to permit illustration of both the tops of the inserts and the lower ends of their tenons in perspective views from above. The functions of the O-ring 52 and 52' in the species of FIGS. 1-7 are performed by integrally molded beads 52" at the bottom (FIG. 8A) or near the bottom (FIGS. 9A-11A) of the tenons.

Figure 11A:
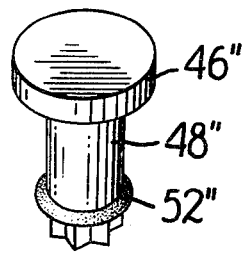

The plan configuration of the calks in FIG. 8A-10A and the wear plate shown in FIG. 11A conforms in size and shape to the plan configuration of the recesses 32 in the bosses 26 of the shoe sections in FIGS. 8-11, respectively. The walls of the recesses 32 are supported by the capitals of the inserts, and the recessing of the capitals into their close fitting recesses prevents dirt from becoming wedged between the recess floor and the capital. In addition, these capitals provide horizontal lever arms that help support the calks against torsional forces encountered when the horse runs, which forces would tend to break off the top of the calk at its junction with the tenon.

Figure 8A:
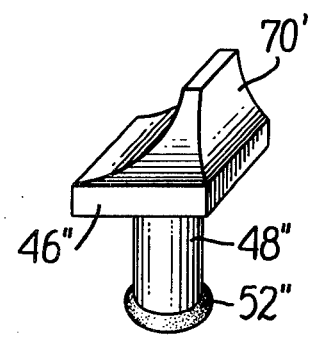
Figure 9:
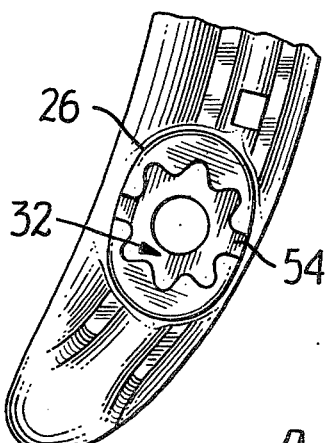
Figure 9A:
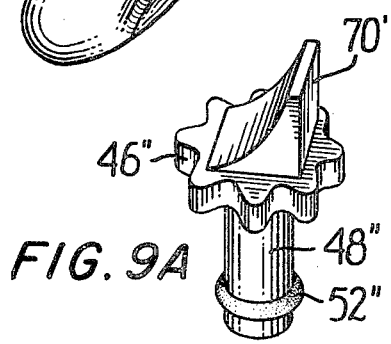
Figure 10A:
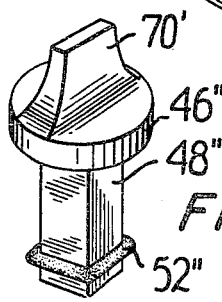

In the species of FIGS. 8A and 9A the plan configuration of the capitals, like that of FIGS. 1-7, are regular geometric figures symmetrical about at least two axes in the plane of the figure. Like the right angle corners in the embodiments of FIGS. 1-7, the geometric figures of the capitals in FIGS. 8A and 9A have a plurality of symmetrical bends whose axes of symmetry intersect in the center of the tenon to enable the capitals to be positioned in the recesses 32 in as many positions as there are symmetrical bends.

The horizontal cross-sectional shape of the bore is a symmetrical closed figure, either a circle (FIGS. 1-9) or a regular figure (FIGS. 10 and 11) having a number of symmetrical bends whose axes of symmetry intersect the axis of the bore. This enables the tenon to be positioned in the bore in as many positions as there are bends. For example, the species of FIG. 11A can be positioned in any of six different positions which would enable the calk (not illustrated) for this species to face in any of six different directions.

The ease and speed with which the inserts may be exchanged makes it possible, for the first time, for a trainer to experiment with various shapes, sizes, materials and combinations thereof to optimally adapt the racing plates for the particular characteristics of the horse, and material and condition of the track on which he is to run. Now, literally for the first time in the history of horse racing, the trainer is provided with a realistic opportunity to exercise his professional judgment as to the configuration of the racing plate his horses are to use in the constantly changing conditions under which they train and race.

The species of FIGS. 1-7 is the preferred form of this invention, the species of FIGS. 8-11 are disclosed specifically to illustrate other forms of my invention and to give concrete expression to various aspects of its scope. Obviously, numerous other modifications and variations of the disclosed embodiments are possible in view of this disclosure, and the invention may be embodied in other forms without departing from the spirit and scope of the appended claims.

I claim:

1. A racing plate for use with exchangeable calks, comprising:
    a thin, lightweight horseshoe having a toe portion and two heel portions disposed rearwardly of said toe portion;
    a boss, formed on both of said heel portions, having an upper surface substantially co-planar with the upper surface of said horseshoe;
    means formed in each of said bosses defining a mortise extending through said horseshoe for receiving selected calks; and
    means formed on each of said bosses, adjacent said mortise, defining a shoulder extending generally normal to the upper surface of said boss for fixing the angular orientation of a calk in said shoe, said shoulder defining means including a shallow, upwardly opening cruciform-shaped channel formed in said boss, said channel being defined by two pairs of vertically extending, horizontally facing walls, the two pairs of walls being disposed at right angles to each other.

2. The racing plate defined in claim 1, wherein one of the arms of said cruciform channel is open at its ends, and the other arm of said cruciform channel is closed at its ends.

3. A racing plate comprising:
    a thin, arcuate body formed of lightweight material and having a central, forward toe portion, said body extending arcuately to the rear and terminating in a pair of heel portions;
    said body having a bottom surface which, when said racing plate is mounted on a horse's hoof, contacts the bottom surface of the horse's hoof;
    said body having a top surface which faces downward and contacts the ground when said racing plate is mounted on a horse's hoof;
    said body having an inside surface extending between said top and bottom surface around the inside of said arcuate body and an outside surface extending between said top and bottom surface around the outside of said arcuate body;
    means defining a groove opening in said top surface and having a plurality of lobes in at least one of said heel portions; said means including a floor having a plurality of lobes facing upwardly, and a plurality of vertical walls forming symmetrical bends, the axes of symmetry of said bends intersecting in the center of said groove; and
    a vertical bore formed entirely through said body and opening in said bottom surface and in said groove floor, said bore having a vertical axis intersecting the center of said groove.

4. A racing plate, comprising:
    a thin, flat, lightweight body having a toe at the central, forward portion of said body and two heels extending arcuately to the rear of said toe and substantially symmetrically disposed about a central axis of said shoe lying through said toe and in the plane of said body;
    said body having a bottom surface which, when said racing plate is mounted on a horse's hoof, contacts the bottom surface of the horse's hoof;
    said body having a top surface which faces downward and contacts the ground when said racing plate is mounted on a horse's hoof;
    said body having an inside surface extending between said top and bottom surface around the inside of said arcuate body and an outside surface extending between said top and bottom surface around the outside of said arcuate body;
    a recess defined by vertical walls and an upwardly facing floor formed in each of said heel portions opening in said top surface and having portions opening in said inside and outside surfaces;
    a bore extending vertically through said shoe and opening in the bottom surface and in the center of said recess;
    an insert having a capital whose shape and size in horizontal plan is the same as the horizontal plan shape and size of said recess, and having a shank formed centrally on said capital and depending perpendicularly therefrom, said shank having a horizontal cross-section which is the same shape and size as the horizontal cross section of said bore;

one of said bore and said recess horizontal plan shapes being a regular geometric figure symmetrical about at least two axes lying in the plane of the figure;

a resilient annular form compressed between said shank and the interior wall of said bore to releasably hold said shank in said bore;

whereby said shank may be inserted in said bore, compressing said annular form, with said capital lying snuggly in said recess to support said walls and to exclude dirt from becoming wedged between the under surface of said capital and said floor, and with the equilateral sides of said one of said capital and said shank selectively aligned with the equilateral sides of said one of said bore and said recess to maintain the selected angular position of said insert in said body.

5. A racing plate as defined in claim 4, wherein said shank includes an annular cannelure formed adjacent the lower end thereof, and said annular form is an O-ring disposed in said cannelure and projecting therefrom beyond the walls of said shank.

6. A racing plate as defined in claim 5, wherein said shank is cylindrical in form and said capital is cruciform in plan.

7. A racing plate as defined in claim 6 wherein one arm of said cruciform capital has a cleat formed on and projecting upwardly therefrom.

8. A racing plate as defined in claim 4, wherein said shank is a molding of plastic material and said annular form is an integrally moded bead formed on said shank adjacent the lower end thereof.

9. The racing plate defined in claim 8 wherein said shank is cylindrical in form and said bead is formed as a larger diameter portion at the bottom end of said shank.

10. A racing plate for use with exchangeable inserts, comprising:

a thin lightweight, flat body having a toe at the central, forwardmost portion of said body and being curved rearwardly from said toe symmetrically about an axis lying through said toe and in the plane of said body, said body terminating in a pair of heels disposed symmetrically about said axis;

said body having a flat bottom surface which abuts the underside of the horse's hoof when said racing plate is affixed to the hoof of a horse, a top surface which engages the ground when the racing plate is affixed to the hoof of a horse and the horse is standing, an inside surface extending from the top surface to the bottom surface and running around the inside of the curved body, and an outside surface extending from the top surface to the bottom surface and extending around the outside of the curved body;

each of said heels having formed therein an opening, including:
  (1) a recess defined by upright walls and an upwardly facing floor in said heels, said walls opening in said inside and outside surfaces of said body, and
  (2) a mortise having a vertical axis and opening in said bottom surface and also in the center of said recess;

an insert having a tenon with a vertical axis and a capital connected to the top end of said tenon, said capital having a horizontal area greater than the horizontal cross sectional area of said tenon to provide a moment arm to support said insert from rupture at the junction of said capital and said tenon, said capital having a plan configuration and size substantially the same as the plan configuration and size of said recess to enable said capital to fit snuggly within said recess and support thereby the upright walls of said recess, said capital engaging with the undersurface thereof the floor of said recess to limit the vertical penetration of said insert into said opening to prevent said tenon from being driven too deeply into said mortise into forceful engagement with the horse's hoof, said tenon having a cross sectional plan configuration and size substantially the same as the cross sectional configuration and size of said mortise;

said tenon having a continuous resilient bead extending around the circumference of said tenon adjacent the lower end thereof to releasably hold said tenon within said mortise;

one of said mortise and said recess having a plan configuration which is a symmetrical figure formed of symmetrical bends whose axes of symmetry intersect at the axis of said mortise to enable said insert to be positioned within said opening in as many positions as there are symmetrical bends.

11. A racing plate for use with exchangeable inserts, comprising:

a thin lightweight, flat body having a toe at the central, forwardmost portion of said body and being curved rearwardly from said toe symmetrically about an axis lying through said toe and in the plane of said body, said body terminating in a pair of heels disposed symmetrically about said axis;

said body having a flat bottom surface which abuts the underside of the horse's hoof when said racing plate is affixed to the hoof of a horse, a top surface which engages the ground when the racing plate is affixed to the hoof of a horse and the horse is standing, an inside surface extending from the top surface to the bottom surface and running around the inside of the curved body, and an outside surface extending from the top surface to the bottom surface and extending around the outside of the curved body;

each of said heels having formed therein an opening, including:
  (1) a recess defined by upright walls and an upwardly facing floor in said heels, and
  (2) a mortise having a vertical axis and opening in said bottom surface and also in the center of said recess;

an insert having a tenon with a vertical axis and a capital connected to the top end of said tenon, said capital having a horizontal area greater than the horizontal cross sectional area of said tenon to provide a moment arm to support said insert from rupture at the junction of said capital and said tenon, said capital having a plan configuration and size substantially the same as the plan configuration and size of said recess to enable said capital to fit snugly within said recess and support thereby the upright walls of said recess, said capital engaging with the undersurface thereof the floor of said recess to limit the vertical penetration of said insert into said opening to prevent said tenon from being driven too deeply into said mortise into forceful engagement with the horse's hoof, said tenon having a cross sectional plan configuration and size substantially the same as the cross sectional configuration and size of said mortise;

one of said mortise and said recess having a plan configuration which is a symmetrical figure formed of symmetrical bends whose axes of symmetry intersect at the axis of said mortise to enable said insert to be positioned within said opening in as many positions as there are symmetrical bends.

* * * * *